United States Patent
Meguro (10) Patent No.: US 12,162,315 B2
(45) Date of Patent: Dec. 10, 2024

(54) TIRE

(71) Applicant: Sumitomo Rubber Industries, Ltd., Kobe (JP)

(72) Inventor: Yuya Meguro, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 101 days.

(21) Appl. No.: 17/963,358

(22) Filed: Oct. 11, 2022

(65) Prior Publication Data

US 2023/0125142 A1   Apr. 27, 2023

(30) Foreign Application Priority Data

Oct. 26, 2021   (JP) ................. 2021-174924
Jul. 26, 2022   (JP) ................. 2022-118521

(51) Int. Cl.
*B60C 11/13*   (2006.01)
*B60C 11/03*   (2006.01)

(52) U.S. Cl.
CPC ........... *B60C 11/1392* (2013.01); *B60C 2011/0341* (2013.01); *B60C 2011/0367* (2013.01)

(58) Field of Classification Search
CPC ............ B60C 11/0304; B60C 11/1369; B60C 2011/0381; B60C 2011/0383; B60C 11/125; B60C 11/033
See application file for complete search history.

(56) References Cited

U.S. PATENT DOCUMENTS

2002/0092591 A1*   7/2002   Cortes ............. B60C 11/0309
                                                    152/209.16
2013/0112325 A1   5/2013   Mukai
(Continued)

FOREIGN PATENT DOCUMENTS

JP    2016-107912 A    6/2016
JP    2017-39407 A     2/2017
(Continued)

OTHER PUBLICATIONS

JP 2020-104721 Machine Translation; Sano, Shingo (Year: 2020).*
Extended European Search Report for European Application No. 22202251.9, dated Mar. 14, 2023.

*Primary Examiner* — Katelyn W Smith
*Assistant Examiner* — Nicholas J Weiler
(74) *Attorney, Agent, or Firm* — Birch, Stewart, Kolasch & Birch, LLP (57) ABSTRACT

A tire includes a tread portion including a first shoulder land portion provided with first shoulder lateral grooves extending from a first tread edge to a first shoulder circumferential groove, a second shoulder land portion provided with second shoulder lateral grooves extending from a second tread edge and terminating within the second shoulder land portion, a first middle land portion provided with first middle lateral grooves extending from the first shoulder circumferential groove and terminating within the first middle land portion, a second middle land portion provided with outer and inner second middle lateral grooves respectively extending from the second crown circumferential groove and the second shoulder circumferential groove and terminating within the second middle land portion, and a crown land portion provided with crown lateral grooves extending from the first crown circumferential groove and terminating within the crown land portion.

17 Claims, 9 Drawing Sheets

(56) References Cited

U.S. PATENT DOCUMENTS

| | | | |
|---|---|---|---|
| 2016/0101655 A1* | 4/2016 | Shibayama | B60C 11/1323 |
| | | | 152/209.18 |
| 2016/0152092 A1* | 6/2016 | Sasaki | B60C 11/0304 |
| | | | 152/209.1 |
| 2017/0050470 A1 | 2/2017 | Kanematsu | |
| 2018/0264891 A1 | 9/2018 | Uno | |
| 2018/0297413 A1 | 10/2018 | Nakamichi | |
| 2019/0152268 A1* | 5/2019 | Kanamura | B60C 11/0008 |
| 2020/0122513 A1 | 4/2020 | Miyazaki | |
| 2020/0238766 A1* | 7/2020 | Hamaoka | B60C 11/0304 |

FOREIGN PATENT DOCUMENTS

| | | |
|---|---|---|
| JP | 2019-182407 A | 10/2019 |
| JP | 2020104721 A * | 7/2020 |
| JP | 6891559 B2 | 6/2021 |

* cited by examiner

TIRE

RELATED APPLICATIONS

This application claims the benefit of foreign priority to Japanese Patent Applications No. JP2021-174924, filed Oct. 26, 2021 and No. JP2022-118521, filed Jul. 26, 2022, which are incorporated by reference in its entirety.

FIELD OF THE DISCLOSURE

The present disclosure relates to a tire.

BACKGROUND OF THE DISCLOSURE

Patent Document 1 below has proposed a tire with a tread portion having a designated mounting direction on a vehicle. The tread portion of the tire includes a crown land portion defined between an outer crown circumferential groove and an inner crown circumferential groove. The crown land portion is provided with first crown sipes each having one end in communication with the outer crown circumferential groove and the other end terminating within the crown land portion, and second crown sipes each having one end in communication with the inner crown circumferential groove and the other end terminating within the crown land portion. In addition, the first crown sipes, with respect to the tire axial direction, are inclined in the same direction as the second crown sipes at an angle different from that of the second crown sipes.

PATENT DOCUMENT

[Patent document 1] Japanese Unexamined Patent Application Publication 2019-182407

SUMMARY OF THE DISCLOSURE

In recent years, with the improvement of vehicle performance, it has been required to further improve both steering stability on dry road surfaces and wet performance.

The present disclosure has been made in view of the above circumstances and has a major object to provide a tire capable of improving both steering stability on dry road surfaces and wet performance.

In one aspect of the present disclosure, a tire includes a tread portion having a designated mounting direction on a vehicle, the tread portion including a first tread edge located outside the vehicle when mounted on the vehicle, a second tread edge located inside the vehicle when mounted on the vehicle, a plurality of circumferential grooves extending continuously in a tire circumferential direction between the first tread edge and the second tread edge, and a plurality of land portions divided by the plurality of circumferential grooves. The plurality of circumferential grooves includes a first shoulder circumferential groove located between the first tread edge and a tire equator, a second shoulder circumferential groove located between the second tread edge and the tire equator, a first crown circumferential groove located between the first shoulder groove and the tire equator, and a second crown circumferential groove located between the second shoulder groove and the tire equator. The plurality of land portions includes a first shoulder land portion having the first tread edge, a second shoulder land portion having the second tread edge, a first middle land portion divided between the first shoulder circumferential groove and the first crown circumferential groove, a second middle land portion divided between the second shoulder circumferential groove and the second crown circumferential groove, and a crown land portion divided between the first crown circumferential groove and the second crown circumferential groove. The first shoulder land portion is provided with a plurality of first shoulder lateral grooves extending at least from the first tread edge to the first shoulder circumferential groove. The second shoulder land portion is provided with a plurality of second shoulder lateral grooves extending inwardly in a tire axial direction at least from the second tread edge and terminating within the second shoulder land portion. The first middle land portion is provided with a plurality of first middle lateral grooves extending from the first shoulder circumferential groove and terminating within the first middle land portion. The second middle land portion is provided with a plurality of outer second middle lateral grooves extending from the second crown circumferential groove and terminating within the second middle land portion and a plurality of inner second middle lateral grooves extending from the second shoulder circumferential groove and terminating within the second middle land portion. The crown land portion is provided with a plurality of crown lateral grooves extending from the first crown circumferential groove and terminating within the crown land portion.

DETAILED DESCRIPTION OF THE DISCLOSURE

Hereinafter, one or more embodiments of the present disclosure will be described with reference to the drawings.

Figure 1:
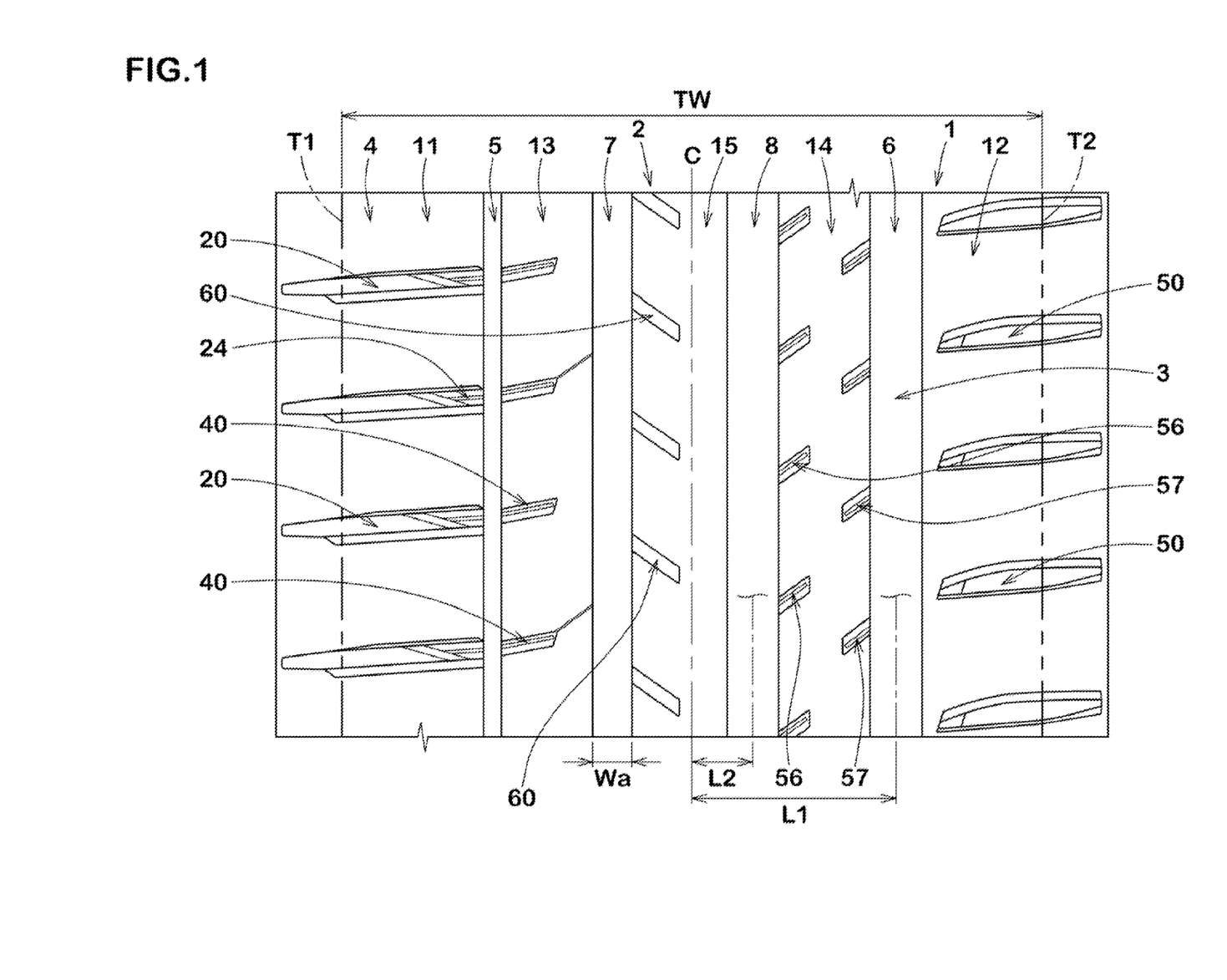
FIG. 1 is a development view of a tread portion of a tire according to an embodiment of the present disclosure.

FIG. 1 is a development view of a tread portion 2 of a tire 1 showing an embodiment of the present disclosure. The tire 1 according to the present embodiment, for example, is suitably used as a pneumatic tire for passenger car. However, the present disclosure is not limited to such an embodiment, and may be applied to a pneumatic tire for heavy load and a non-pneumatic tire in which the inside of the tire is not filled with pressurized air.

As illustrated in FIG. 1, the tread portion 2 has a designated mounting direction on a vehicle. The tread portion 2 includes a first tread edge T1 which is intended to be located outside the vehicle when mounted on the vehicle, and a second tread edge T2 which is intended to be located inside the vehicle when mounted on the vehicle.

The first tread edge T1 and the second tread edge T2 are the axial outermost edges of the ground contacting patch of the tire 1 which occurs under the condition such that the tire 1 under a normal state is grounded on a plane with a standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization on which the tire is based, wherein the standard tire load is the "maximum load capacity" in JATMA, the maximum value given in the "Tire Load Limits at Various Cold Inflation Pressures" in TRA, and the "Load Capacity" in ETRTO, for example. For tires for which no standards have been established, "standard tire load" refers to the maximum load applicable to the tire under the purpose of using the tire properly.

The tread portion 2 of the tire 1 includes a plurality of circumferential grooves 3 extending continuously in the tire circumferential direction between the first and second tread edges T1 and T2, and a plurality of land portions 4 divided by the plurality of circumferential grooves 3.

The circumferential grooves 3 include a first shoulder circumferential groove 5, a second shoulder circumferential groove 6, a first crown circumferential groove 7 and a second crown circumferential groove 8. The first shoulder circumferential groove 5 is located between the first tread edge T1 and the tire equator C. The second shoulder circumferential groove 6 is located between the second tread edge T2 and the tire equator C. The first crown circumferential groove 7 is located between the first shoulder circumferential groove 5 and the tire equator C. The second crown circumferential groove 8 is located between the second shoulder circumferential groove 6 and the tire equator C.

It is preferable that a distance L1 in the tire axial direction from the tire equator C to the groove centerline of the first shoulder circumferential groove 5 or the second shoulder circumferential groove 6, for example, is in a range from 25% to 35% of the tread width TW. It is also preferable that a distance L2 in the tire axial direction from the tire equator C to the groove centerline of the first crown circumferential groove 7 or the second crown circumferential groove 8, for example, is in a range from 5% to 20% of the tread width TW. Note that the tread width TW is the distance in the tire axial direction from the first tread edge T1 to the second tread edge T2 in the normal state.

In the present embodiment, each of the circumferential grooves 3, for example, extends linearly parallel to the tire circumferential direction. Each of the grooves 3, for example, may extend in a wavy shape.

A groove width Wa of each of the circumferential grooves 3 is preferably at least 3 mm. Further, the groove width Wa of each of the circumferential grooves 3 is preferably in a range from 3.0% to 5.0% of the tread width TW. A groove depth of each of the circumferential grooves 3 is preferably in a range from 5 to 10 mm. As a more preferred embodiment, in the present embodiment, the first shoulder circumferential groove 5 has the smallest groove width and the smallest depth among the plurality of circumferential grooves 3. However, the present disclosure is not limited to such an aspect.

The land portions 4 includes a first shoulder land portion 11, a second shoulder land portion 12, a first middle land portion 13, a second middle land portion 14, and a crown land portion 15. The first shoulder land portion 11 includes the first tread edge T1, and is disposed outwardly in the tire axial direction of the first shoulder circumferential groove 5. The second shoulder land portion 12 includes the second tread edge T2, and is disposed outwardly in the tire axial direction of the second shoulder circumferential groove 6. The first middle land portion 13 is defined between the first shoulder circumferential groove 5 and the first crown circumferential groove 7. The second middle land portion 14 is defined between the second shoulder circumferential groove 6 and the second crown circumferential groove 8. The crown land portion 15 is defined between the first crown circumferential groove 7 and the second crown circumferential groove 8.

In the present disclosure, the first shoulder land portion 11 is provided with a plurality of first shoulder lateral grooves 20 extending at least from the first tread edge T1 to the first shoulder circumferential groove 5. As used herein, unless otherwise specified, the features described for one first shoulder lateral groove 20 can be applied to each of the plurality of first shoulder lateral grooves 20. The same applies to the lateral grooves on the other land portions.

The second shoulder land portion 12 is provided with a plurality of second shoulder lateral grooves 50 extending inwardly in the tire axial direction at least from the second tread edge T2 and terminating within the second shoulder land portion 12.

The first middle land portion 13 is provided with a plurality of first middle lateral grooves 40. The first middle lateral grooves 40 extend from the first shoulder circumferential groove 5 and terminating within the first middle land portion 13. The second middle land portion 14 is provided with a plurality of outer second middle lateral grooves 56, and a plurality of inner second middle lateral grooves 57. The outer second middle lateral grooves 56 extend from the second crown circumferential groove 8 and terminate within the second middle land portion 14. The inner second middle lateral grooves 57 extend from the second shoulder circumferential groove 6 and terminate within the second middle land portion 14. The crown land portion 15 is provided with a plurality of crown lateral grooves 60. The crown lateral grooves 60 extend from the first crown circumferential groove 7 and terminate within the crown land portion 15.

By adopting the above configuration, the tire 1 according to the present disclosure can achieve both steering stability on dry road surfaces (hereinafter sometimes simply referred to as "steering stability") and wet performance. The reason for this may be presumed as follows.

In the present disclosure, since the first shoulder lateral grooves 20 extend from the first tread edge T1 to the first shoulder circumferential groove 5, the first shoulder lateral grooves 20 can exhibit sufficient drainage, improving wet performance. In addition, since the first middle lateral grooves 40 and the crown lateral grooves 60 terminate within the respective land portion on which these grooves are provided, the rigidity of the first middle land portion 13 and the crown land portion 15 can be maintained, ensuring steering stability on dry road surfaces.

On the other hand, in the present disclosure, since the first middle lateral grooves 40 and the crown lateral grooves 60 are in communication with the respective circumferential grooves which are located on the first tread edge T1 side with respect to these grooves, the water pushed out by the first middle land portion 13 and the crown land portion 15 can be easily guided to the first tread edge T1 side during wet running, and thus it can be easily discharged quickly by the first shoulder lateral grooves 20. Due to the above mechanism, higher drainage can be achieved than with the conventional arrangement of grooves.

Further, in the present disclosure, since the second shoulder lateral grooves 50 extend at least from the second tread edge T2 and terminate within the second shoulder land portion 12, wet performance can be improved while ensuring the rigidity of the second shoulder land portion 12.

In the above-mentioned tire in which the crown lateral grooves 60 and the second shoulder lateral grooves 50 terminate within the respective land portions, there is a risk that the second crown circumferential grooves 8 and the second shoulder circumferential grooves 6 cannot exhibit sufficient drainage performance as they are. However, in the present disclosure, since the outer second middle lateral grooves 56 and the inner second middle lateral grooves 57 are arranged, these lateral grooves can cooperate with the second crown circumferential groove 8 and the second shoulder circumferential groove 6, exhibiting sufficient drainage. Moreover, since these lateral grooves terminate within the respective land portions, the second middle land portion 14 can exhibit sufficient rigidity and maintain steering stability on dry road surfaces. For the above reasons, the tire 1 according to the present disclosure can achieve both steering stability on dry road surfaces and wet performance.

Hereinafter, a more detailed configuration of the present embodiment will be described. Note that each configuration described below shows a specific aspect of the present embodiment. Thus, the present disclosure can exert the above-mentioned effects even if it does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

Figure 2:
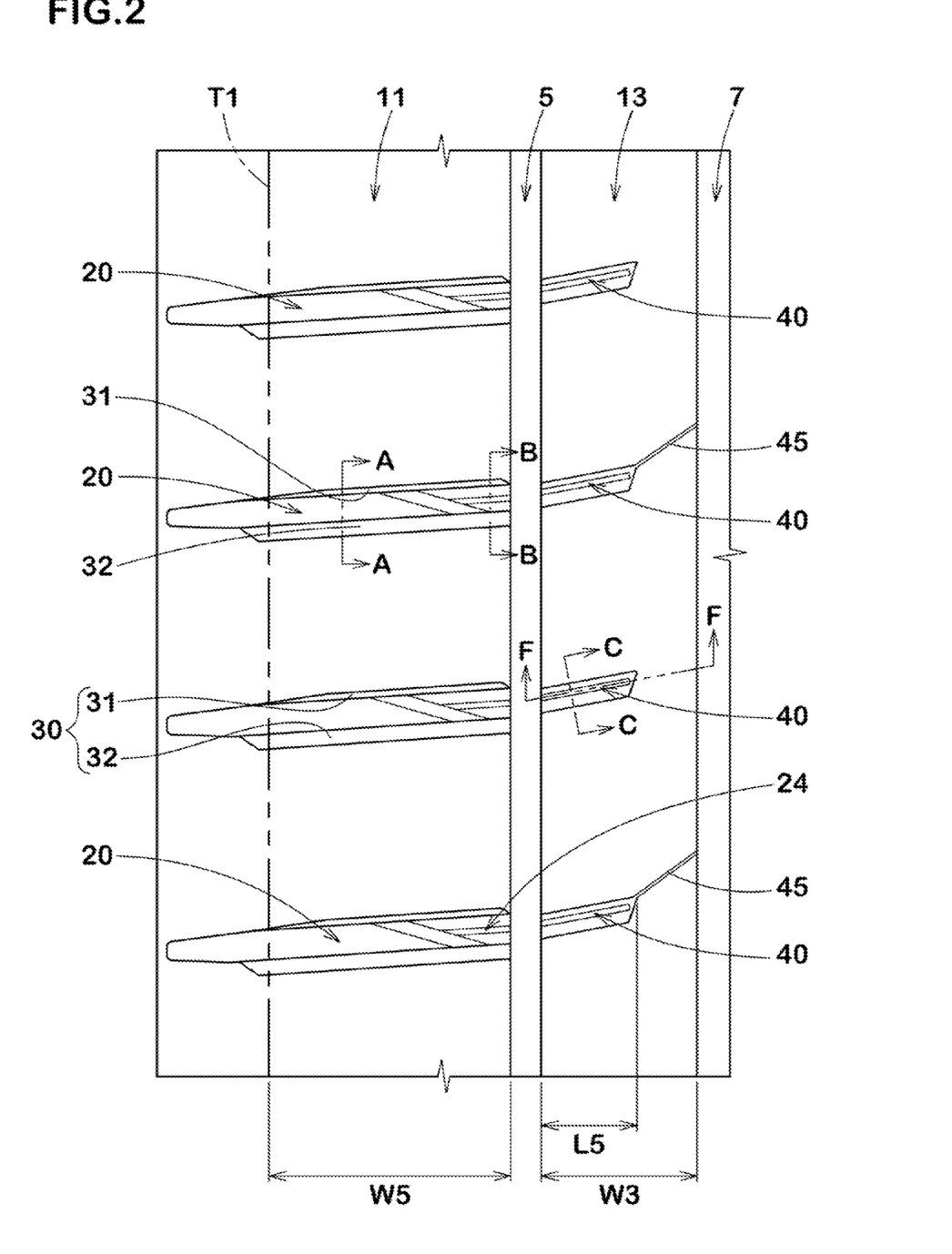
FIG. 2 is an enlarged view of a first shoulder land portion and a first middle land portion of FIG. 1.

FIG. 2 is an enlarged view of the first shoulder land portion 11 and the first middle land portion 13. As illustrated in FIG. 2, the first shoulder lateral grooves 20 according to the present embodiment extend outwardly in the tire axial direction to a location beyond the first tread edge T1.

Figure 3:
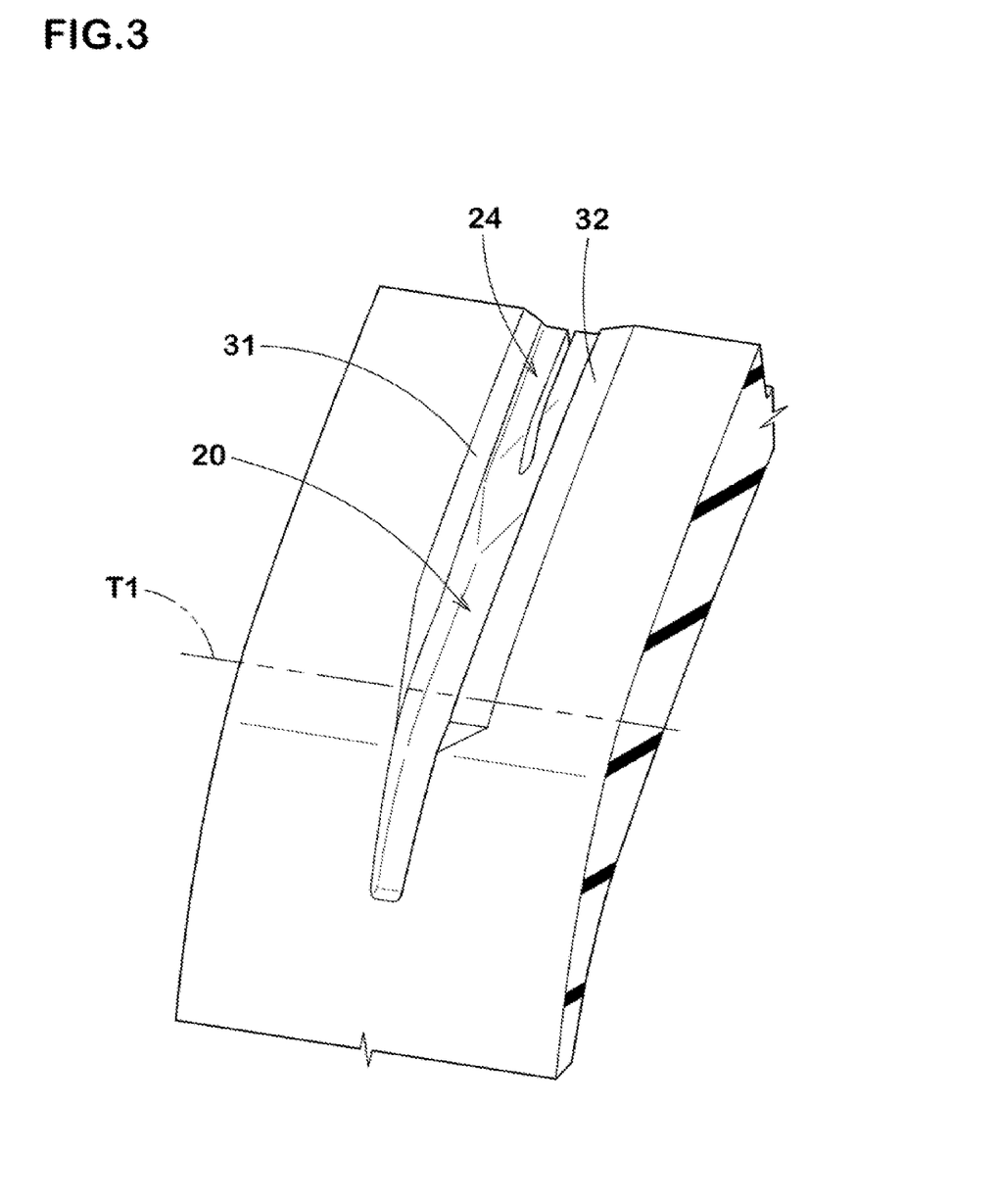
FIG. 3 is an enlarged perspective view of a first shoulder lateral groove in FIG. 2.
Figure 4:
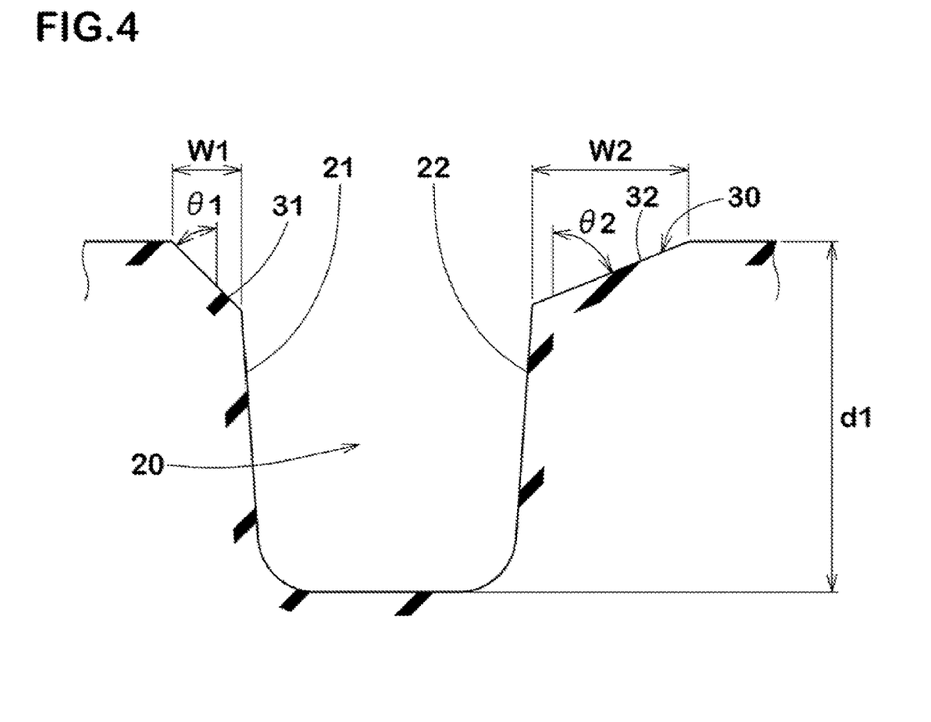
FIG. 4 is a cross-sectional view taken along the line A-A of FIG. 2.

FIG. 3 illustrates an enlarged perspective view of one of the first shoulder lateral grooves 20. FIG. 4 illustrates a cross-sectional view taken along the line A-A of FIG. 2. As illustrated in FIG. 3 and FIG. 4, each first shoulder lateral groove 20 includes a first groove wall 21 and a second groove wall 22 which face each other and extend in the tire radial direction and a groove bottom. In addition, at least one first shoulder lateral groove 20 includes a tie-bar 24 in which the groove bottom portion raises locally. In the present embodiment, the first groove wall 21 is located on one side in the tire circumferential direction of the first shoulder lateral groove 20 (e.g., corresponding to the upper side in FIG. 2, and hereinafter referred to as the first side in the tire circumferential direction), and the second groove wall 22 is located on the other side in the tire circumferential direction of the first shoulder lateral groove 20 (e.g., corresponding to the lower side in FIG. 2, and hereinafter referred to as the second side in the tire circumferential direction). The tie-bar 24 can increase the rigidity of the first shoulder land portion 11 and help to improve steering stability.

Figure 5:
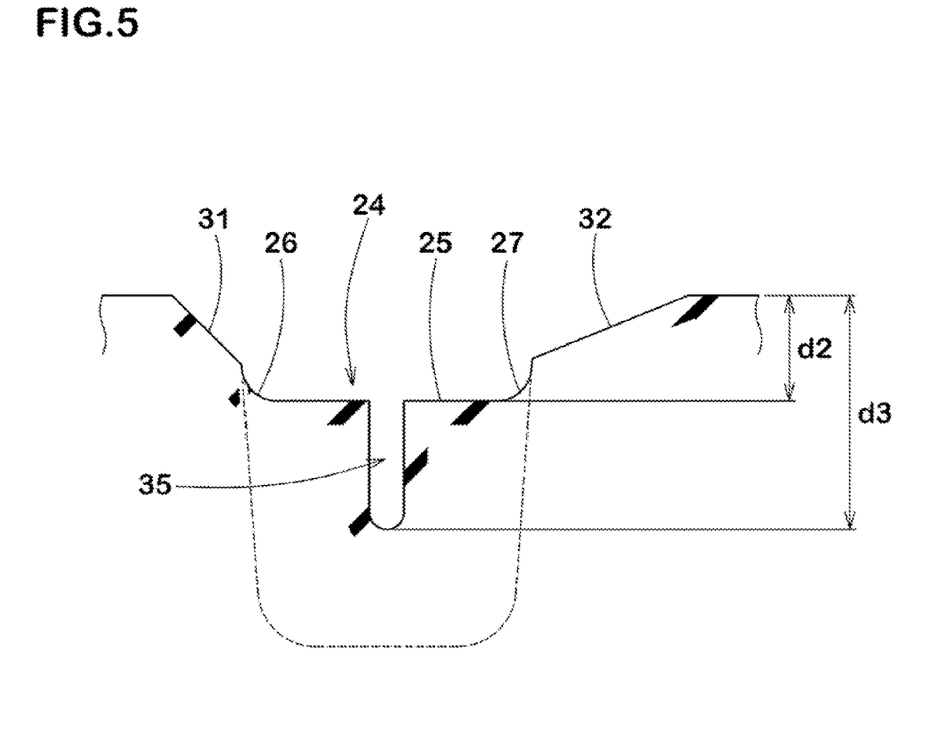
FIG. 5 is a cross-sectional view taken along the line B-B of FIG. 2.
Figure 6:
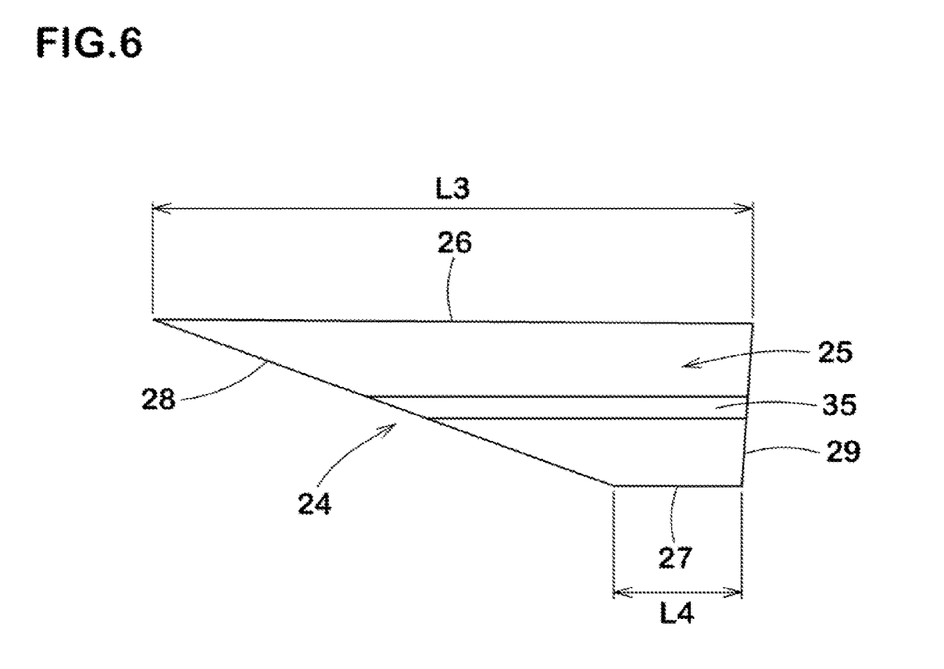
FIG. 6 is an enlarged plan view of a tie-bar.

FIG. 5 illustrates a cross-sectional view taken along the line B-B of FIG. 2. As illustrated in FIG. 5, the tie-bar 24 includes an outer surface 25 extending along a ground contact surface of the first shoulder land portion 11, and the outer surface 25 is connected to the first groove wall 21 and the second groove wall 22. FIG. 6 illustrates an enlarged plan view of the outer surface 25. As illustrated in FIG. 6, the outer surface 25 includes a first edge 26 connected to the first groove wall 21, and a second edge 27 connected to the second groove wall 22. The first edge 26 and the second edge 27 are boundaries between the outer surface 25 and a respective one of the first groove wall 21 and the second groove wall 22. When the outer surface 25 is connected to the first groove wall 21 or the second groove wall 22 via a curved surface, the boundary is the intermediate position of the curve constituting the curved surface in a cross section of the first shoulder lateral groove 20.

Conventional tie-bars could exert the effect of improving the rigidity of the tread land portion, but the ground contact surface of the land portion was slightly distorted around the tie-bar, and there has been a risk that the ground contacting pressure acting around the tie bar became non-uniform. In order to make the above-mentioned ground pressure uniform, in the present disclosure, a length L4 of the second edge 27 of the outer surface 25 of the tie-bar 24 is smaller than a length L3 of the first edge 26. As a result, moderate deformation can be expected on the second groove wall 22 side where the second edge 27 is connected, and the ground contacting pressure acting around the tie-bar can be made uniform. Thus, a large gripping force can be exhibited in the area around the tie-bar, and further improvement in steering stability can be expected.

As illustrated in FIG. 2, the first shoulder lateral grooves 20, for example, are inclined at a small angle with respect to the tire axial direction. In the present embodiment, the first shoulder lateral grooves 20, for example, are inclined with respect to the tire axial direction toward one side in the tire circumferential direction (upward toward the right in FIG. 2) from the first tread edge T1 side toward the second tread edge T2. The maximum angle of the first shoulder lateral grooves 20 with respect to the tire axial direction, for example, is equal to or less than 15 degrees. As a result, the drainage of the first shoulder lateral grooves 20 can be improved. Note that an angle of a lateral groove with respect to the tire axial direction, for example, is measured at the centerline of the groove.

As illustrated in FIG. 4, the maximum depth d1 of the first shoulder lateral grooves 20 is in a range from 80% to 100% of the maximum depth of the first shoulder circumferential groove 5. Such first shoulder lateral grooves 20 can exert a good balance between steering stability and wet performance.

As illustrated in FIG. 2 and FIG. 3, it is preferable that each tie-bar 24 is arranged inwardly in the tire axial direction from the center position in the tire axial direction of the ground contact surface (the surface between the first tread edge T1 and the first shoulder circumferential groove 5) of the first shoulder land portion 11. As a more preferred embodiment, each tie-bar 24 of the present embodiment is provided on the end of each first shoulder lateral groove 20 on the first shoulder circumferential groove 5 side. Such a tie-bar 24 can help to improve steering stability.

As illustrated in FIG. 5, a depth d2 from the ground contact surface of the first shoulder land portion 11 to the outer surface 25 of the tie-bar 24 is preferably in a range from 15% to 35% of the maximum depth d1 of the first shoulder lateral groove 20 (shown in FIG. 4). This can improve steering stability and wet performance in a well-balanced manner.

As illustrated in FIG. 6, in a tread plan view, the outer surface 25 of each tie-bar 25 preferably has a trapezoidal shape. That is, the outer surface 25 has a quadrilateral shape surrounded by the first edge 26 and the second edge 27 which extend parallel to each other, and a third edge 28 and a fourth edge 29 which extend non-parallel to each other. The third edge 28 is located on the first tread edge T1 (shown in FIG. 2) side, and the fourth edge 29 is located on the first shoulder circumferential groove 5 (shown in FIG. 2) side.

The length L3 of the first edge 26 (i.e., so-called periphery length, and the same applies hereafter) and the length L4 of the second edge 27 are preferably in a range from 10% to 50% of a width W5 in the tire axial direction of the ground contact surface of the first shoulder land portion 11 (shown in FIG. 2). The length L4 of the second edge 27 is preferably equal to or more than 20% of the length L3 of the first edge 26, more preferably equal to or more than 30%, but preferably equal to or less than 60%, more preferably equal to or less than 50%. By setting the relationship between the length L3 and the length L4 in this way, the third edge 28, for example, is inclined at an angle of from 10 to 30 degrees with respect to the tire axial direction. The fourth edge 29 extends in parallel with the tire circumferential direction. The outer surface 25 which has the edges defined in this way can improve the rigidity of the first shoulder land portion 11 and make the ground contacting pressure uniform, further improving steering stability.

An area of the outer surface 25 of each tie-bar 25 is preferably equal to or more than 10% of an opening area of each first shoulder lateral groove 20 (shown in FIG. 2) between the first tread edge T1 and the first shoulder circumferential groove 5, more preferably equal to or more than 20%, but preferably equal to or less than 40%, more preferably equal to or less than 30%. This can improve steering stability and wet performance in a well-balanced manner.

As illustrated in FIG. 2 and FIG. 4, each first shoulder lateral groove 20 includes a pair of groove walls (the first groove wall 21 and the second groove wall 22), and at least one of the pair of groove walls is preferably provided with a chamfer portion 30. The chamfer portion 30 includes an inclined surface formed between the ground contact surface of the first shoulder land portion 11 and the groove wall. Such a chamfer portion 30 can help to further improve the uniformity of the ground contacting pressure. As a preferred aspect, in the present embodiment, in each first shoulder lateral grooves 20, the first groove wall 21 is provided with the chamfer portion 30 having a first inclined surface 31 and the second groove wall 22 is provided with the chamfer portion 30 having a second inclined surface 32.

In this embodiment, corresponding to the configuration of the tie-bars 24 described above, the maximum width W1 of the first inclined surface 31 of the chamfer portion 30 formed on the first groove wall 21 differs from the maximum width W2 of the second inclined surface 32 of the chamfer portion 30 formed on the second groove wall 22. Here, the maximum widths W1 and W2 of the chamfer portions 30 are defined as a width measured orthogonal to the longitudinal direction of the lateral groove periphery and along the ground contact surface of the land portion. Specifically, the width W2 of the second inclined surface 32 is greater than the width W1 of the first inclined surface 31. This provides the second inclined surface 32 with a greater width on the second groove wall 22 side, which is easily deformed. Thus, the second inclined surface 32 can be grounded as the second groove wall 22 deforms, and the steering stability can be improved further.

The width W1 of the first inclined surface 31, for example, is in a range from 1.0 to 1.5 mm. The width W2 of the second inclined surface 32, for example, is in a range from 2.5 to 3.5 mm. When the second inclined surface 32 is excessively small, it becomes difficult to obtain the above effects. When the second inclined surface 32 is excessively large, the ground contact surface of the first shoulder land portion 11 becomes small, which may impair steering stability. From this point of view, the width W2 of the second inclined surface 32 is preferably equal to or more than 1.5 times the width W1 of the first inclined surface 31, more preferably equal to or more than 2.0 times, but preferably equal to or less than 3.5 times, more preferably equal to or less than 3.0 times.

An angle θ1 of the first inclined surface 31, for example, is in a range from 35 to 55 degrees with respect to the tire normal line. An angle θ2 of the second inclined surface 32 with respect to the tire normal line is greater than the angle θ1. For example, the angle θ2 is in a range from 60 to 75 degrees. In some more preferred aspects, the chamfer portion 30 on the first groove wall 21 side has the same depth as the chamfer portion 30 on the second groove wall 22. This can prevent uneven wear around the groove edges of the first shoulder lateral grooves 20.

As illustrated in FIG. 5, at least one of the first shoulder lateral grooves 20 is provided with a groove bottom sipe 35 opening at the outer surface 25. A depth d3 from the ground contact surface of the first shoulder land portion 11 to a bottom of the groove bottom sipe 35, for example, is in a range from 50% to 80% of the maximum depth d1 of the first shoulder lateral groove 20 (shown in FIG. 4). Such a groove bottom sipe 35 can help to maintain the drainage of the first shoulder lateral groove 20. As used herein, "sipe" means an incision having a width of from 0.5 to 1.5 mm.

As illustrated in FIG. 2, the first shoulder land portion 11 is provided with only the first shoulder lateral grooves 20 described above and is not provided with other grooves or sipes other than these. This can ensure the above-mentioned effect.

The first middle lateral grooves 40 have a length L5 in the tire axial direction in a range from 30% to 70%, more preferably from 40% to 60%, of a width W3 in the tire axial direction of the ground contact surface of the first middle land portion 13. These first middle lateral grooves 40 can help to balance the steering stability and wet performance.

The first middle lateral grooves 40, for example, are inclined at a small angle with respect to the tire axial direction. In the present embodiment, the first middle lateral grooves 40, for example, are inclined in the same direction as the first shoulder lateral grooves 20 with respect to the tire axial direction. An angle of the first middle lateral grooves 40 with respect to the tire axial direction is, for example, equal to or less than 15 degrees. Thus, the first middle lateral grooves 40 and the first shoulder lateral grooves 20 work together to provide excellent drainage, and improve wet performance.

Preferably, the first middle lateral grooves 40 are in communication with the first shoulder circumferential groove 5 at positions close to the respective first shoulder lateral grooves 20. In particular, it is preferable that areas where the ends of the respective first shoulder lateral grooves 20 on the first shoulder circumferential groove 5 side are extended parallel to the tire axial direction overlap more than 50% of the groove widths of the ends of the respective first middle lateral grooves 40 on the first shoulder circumferential grooves 5 side. Such an arrangement of the first shoulder lateral grooves 20 and the first middle lateral grooves 40 can help to improve wet performance further.

Figure 7:
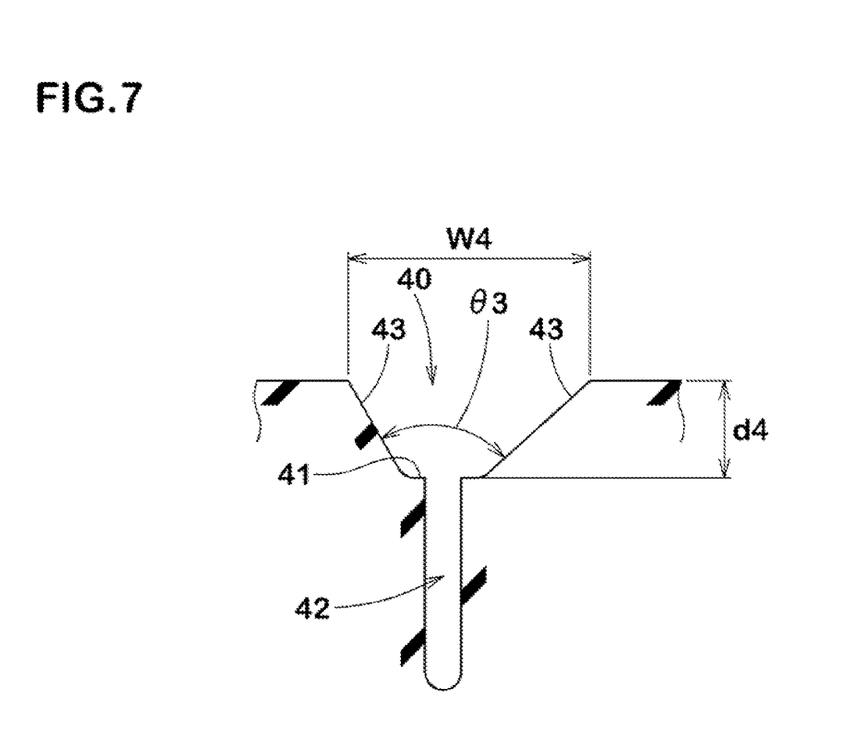
FIG. 7 is a cross-sectional view taken along the line C-C of FIG. 2.

FIG. 7 illustrates a cross-sectional view taken along the line C-C of FIG. 2. As illustrated in FIG. 7, in the present embodiment, the maximum groove depth d4 of the first middle lateral grooves 40 (meaning the maximum groove depth excluding the groove bottom sipes 42 described later) is relatively small. Specifically, the maximum groove depth d4 of the first middle lateral grooves 40 is in a range from 10% to 30% of the maximum groove depth of the first shoulder circumferential groove 5. In some preferred embodiments, the groove depth d4 is less than the depth d2 from the ground contact surface of the first shoulder land portion 11 to the outer surface 25 of one of the tie-bars 24 (shown in FIG. 5), e.g., ranging from 80% to 95% of the depth d2. The first middle lateral grooves 40 as such can improve steering stability on dry road surfaces while exhibiting moderate drainage.

From the viewpoint of improving steering stability and wet performance in a well-balanced manner, it is preferable that the maximum groove width W4 of each of the first middle lateral grooves 40 is in a range from 2.0 to 3.0 times the maximum groove depth d4.

Each of the first middle lateral grooves 40 includes a pair of groove walls 43, and the maximum angle θ3 between the pair of groove walls 43 is preferably equal to or more than 70 degrees. Note that when one or more chamfer portions are provided on the first middle lateral groove 40, the angle θ3 means the angle between the pair of groove walls excluding the chamfer portions. Further, in the present embodiment, the groove walls 43 of the first middle lateral grooves 40 are planar. If the groove walls are curved, the angle θ3 is defined as an angle between a virtual straight line connecting both ends of one groove wall and a virtual straight line connecting both ends of the other groove wall in the cross section of the first middle lateral grooves 40.

In the present embodiment, since the angle θ3 is formed relatively large as described above, a region surrounded by an opening surface of the first middle lateral groove 40 and the pair of groove walls 43 (excluding groove bottom sipes 42 described later) forms as a triangular prism. The first middle lateral groove 40 as such can improve both steering stability on dry road surfaces and wet performance in a well-balanced manner. In addition, from the viewpoint of further improving the effect, the angle θ3 is preferably equal to or more than 80 degrees, more preferably equal to or more than 90 degrees, but preferably equal to or less than 130 degrees, more preferably equal to or less than 120 degrees.

Preferably, the groove bottom 41 of each first middle lateral groove 40 is provided with a groove bottom sipe 42 extending inwardly in the tire radial direction from the groove bottom 41. Such a groove bottom sipe 42 can help to improve wet performance.

Figure 8:
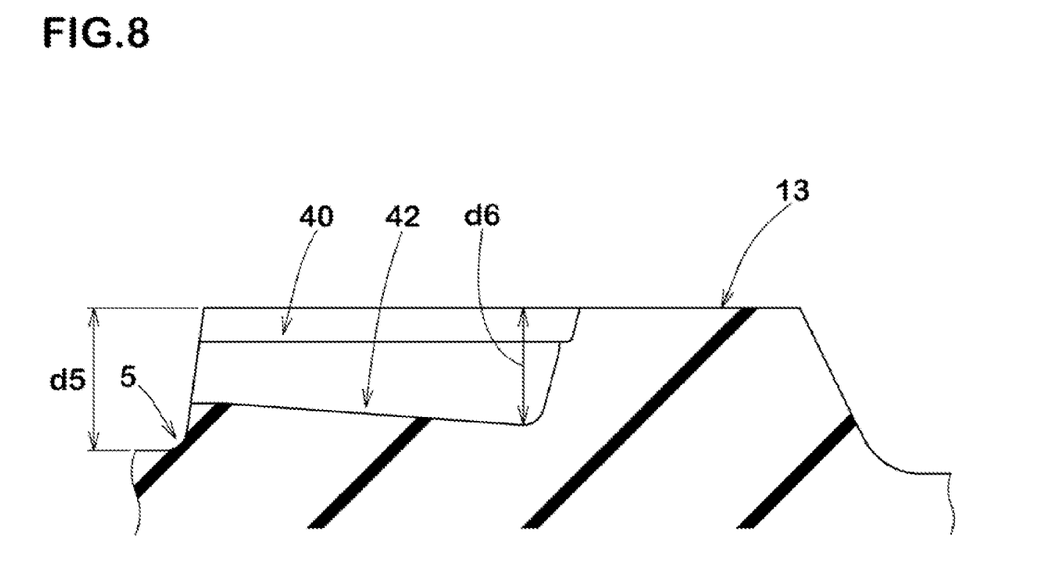
FIG. 8 is a cross-sectional view taken along the line F-F of FIG. 2.

FIG. 8 illustrates a cross-sectional view taken along the line F-F of FIG. 2. As illustrated in FIG. 8, the groove bottom sipe 42 provided on each first middle lateral groove 40 preferably has a depth increasing toward a closed end side of each first middle lateral grooves 40 (the right side in FIG. 8). In addition, the maximum depth d6 from the ground contact surface of the first middle land portion 13 to the bottom of the groove bottom sipe 42 is in a range from 70% to 90% of the maximum groove depth d5 of the first shoulder circumferential groove 5. Such a groove bottom sipe 42 can improve wet performance while maintaining steering stability.

As illustrated in FIG. 2, the first middle land portion 13 is provided with one or more connecting sipes 45 each extending from one of the first middle lateral grooves 40 to the first crown circumferential groove 7. In the present embodiment, the first middle lateral grooves 40 with the connecting sipes 45 and the first middle lateral grooves 40 without the connecting sipes 45 are alternately arranged in the tire circumferential direction. The connecting sipes 45 can provide frictional force during wet driving while maintaining the rigidity of the first middle land portion 13.

The first middle land portion 13 is provided with only the above-mentioned first middle lateral grooves 40 and connecting sipes 45, and is not provided with grooves or sipes other than these. As a result, the above-mentioned effect can be reliably obtained.

Figure 9:
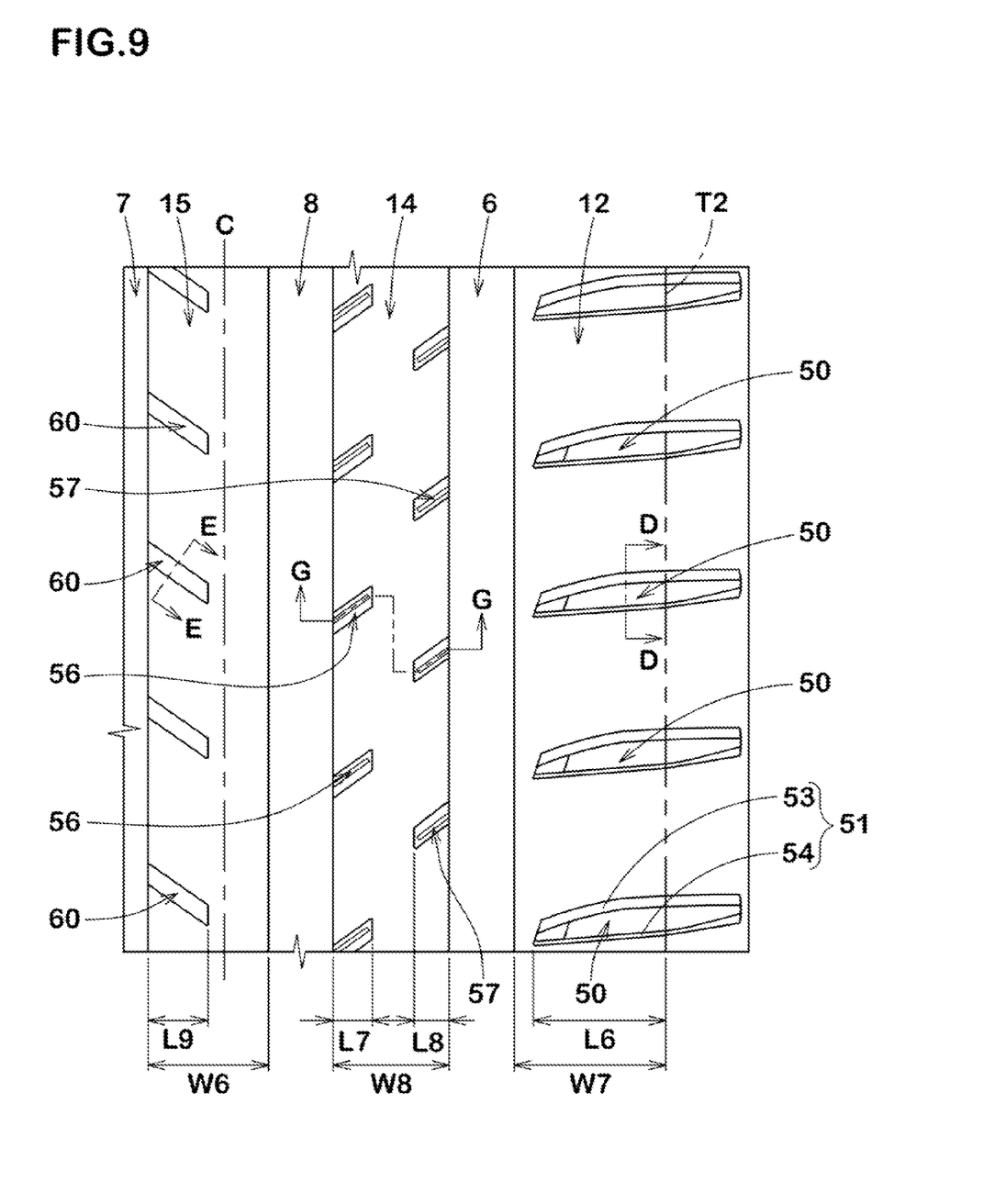
FIG. 9 is an enlarged view of a second shoulder land portion, a second middle land portion and a crown land portion of FIG. 1.

FIG. 9 illustrates an enlarged view of the second shoulder land portion 12, the second middle land portion 14 and the crown land portion 15. As illustrated in FIG. 9, on the ground contact surface of the second shoulder land portion 12, the second shoulder lateral grooves 50 has a length L6 in the tire axial direction in a range from 80% to 95% of a width W7 in the tire axial direction of the second shoulder land portion 12.

Figure 10:
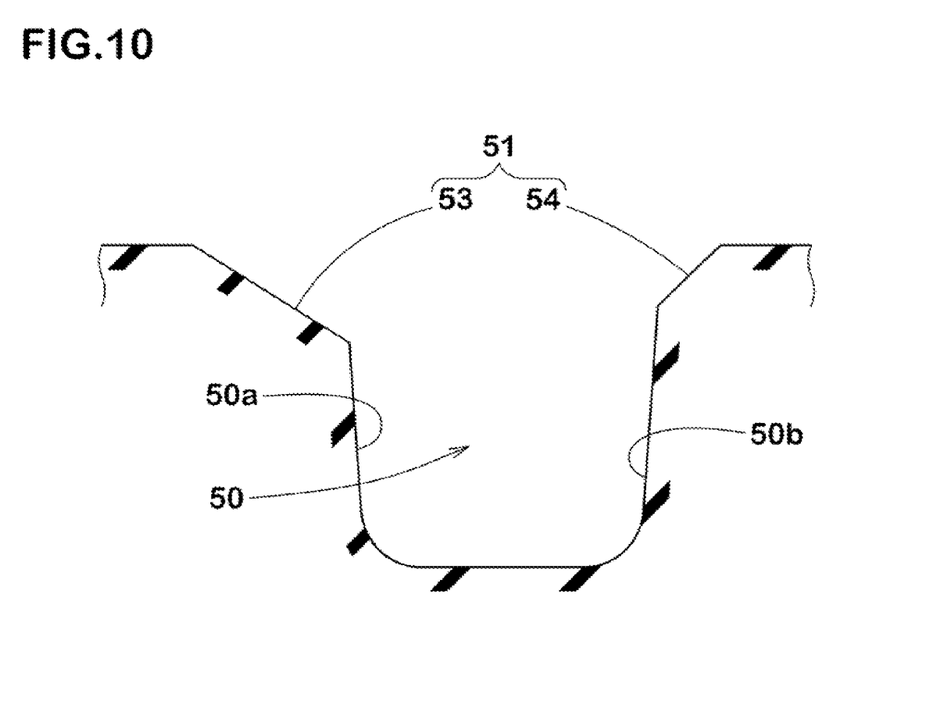
FIG. 10 is a cross-sectional view taken along the line D-D of FIG. 9.

FIG. 10 illustrates a cross-sectional view taken along the line D-D of FIG. 9. As illustrated in FIG. 10, each second shoulder lateral groove 50 includes a pair of groove walls 50a and 50b, and at least one of the groove walls 50a and 50b is provided with a chamfer portion 51. The chamfer portion 51 is composed of an inclined surface connecting between the ground contact surface of the second shoulder land portion 12 and the groove wall. Such a chamfer portion 51 like this can help to further increase the uniformity of the ground contacting pressure around the groove. As a preferred aspect, in this embodiment, the chamfer portion is formed on each of the pair of groove walls 50a and 50b. For example, the groove wall 50a is provided with a third inclined surface 53 as the chamfer portion, and the groove wall 50b is provided with a fourth inclined surface 54 as the chamfer portion.

In the present embodiment, the maximum width of the third inclined surface 53 of the chamfer portion 51 on the groove wall 50a differs from the maximum width of the fourth inclined surface 54 of the chamfer portion 51 on the groove wall 50b. Specifically, in a tread plan view as shown in FIG. 9, the width of the third inclined surface 53 is greater than the width of the fourth inclined surface 54. The configuration of the second inclined surface 32 (shown in FIG. 4) of each first shoulder lateral groove 20 described above can be applied to the third inclined surface 53. Also, the configuration of the first inclined surface 31 (shown in FIG. 4) of each first shoulder lateral groove 20 described above can be applied to the fourth inclined surface 54.

As illustrated in FIG. 9, each third inclined surface 53 is arranged on the first side in the tire circumferential direction of each second shoulder lateral groove 50, and the fourth inclined surface 54 is arranged on the second side in the tire circumferential direction of each second shoulder lateral groove 50. In other words, the first shoulder lateral grooves 20 and the second shoulder lateral grooves 50 are opposite in terms of the size relation of the width of the inclined surfaces of the chamfer portions. This can improve traction performance and braking performance on dry roads in a well-balanced manner.

The second shoulder land portion 12 is provided with only the above-mentioned second shoulder lateral grooves 50, and is not provided with groove or sipes other than these. As a result, the effects described above can be reliably obtained.

A length L7 in the tire axial direction of the outer second middle lateral grooves 56 and a length L8 in the tire axial direction of the inner second middle lateral grooves 57 are preferably in a range from 20% to 50% of a width W8 in the tire axial direction of the ground contact surface of the second middle land portion 14. In some preferred embodiment, the lengths L7 and L8 of the outer second middle lateral grooves 56 and the inner second middle lateral grooves 57, respectively, are smaller than the length L5 in the tire axial direction of the first middle lateral grooves 40 (shown in FIG. 2). This can improve the balance between steering stability on dry road surfaces and wet performance.

The outer second middle lateral grooves 56 and the inner second middle lateral grooves 57, for example, are inclined in the same direction as the first middle lateral grooves 40 (shown in FIG. 2) with respect to the tire axial direction. An angle of the outer second middle lateral grooves 56 and an angle of the inner second middle lateral grooves 57 are in a range from 30 to 40 degrees with respect to the tire axial direction. In addition, the angles of these lateral grooves are greater than the angle of the first middle lateral grooves 40 with respect to the tire axial direction. As a result, wet performance can further be improved.

The outer second middle lateral grooves 56 and the inner second middle lateral grooves 57 each have substantially the same cross-sectional shape as the first middle lateral grooves 40 described above. Thus, the configuration of the cross-sectional shape of the first middle lateral grooves 40 shown in FIG. 7 can be applied to the outer second middle lateral grooves 56 and the inner second middle lateral grooves 57.

The plurality of outer second middle lateral grooves 56 and the plurality of inner second middle lateral grooves have the maximum groove depth in a range from 10% to 30% of the maximum groove depth of the second shoulder circumferential groove 6. In addition, the plurality of outer second middle lateral grooves 56 and the plurality of inner second middle lateral grooves 57 have the maximum groove width in a range from 2.0 to 3.0 times the maximum groove depth. Such outer second middle lateral grooves 56 and inner second middle lateral grooves 57 can improve steering stability on dry road surfaces while exerting moderate drainage.

Figure 11:
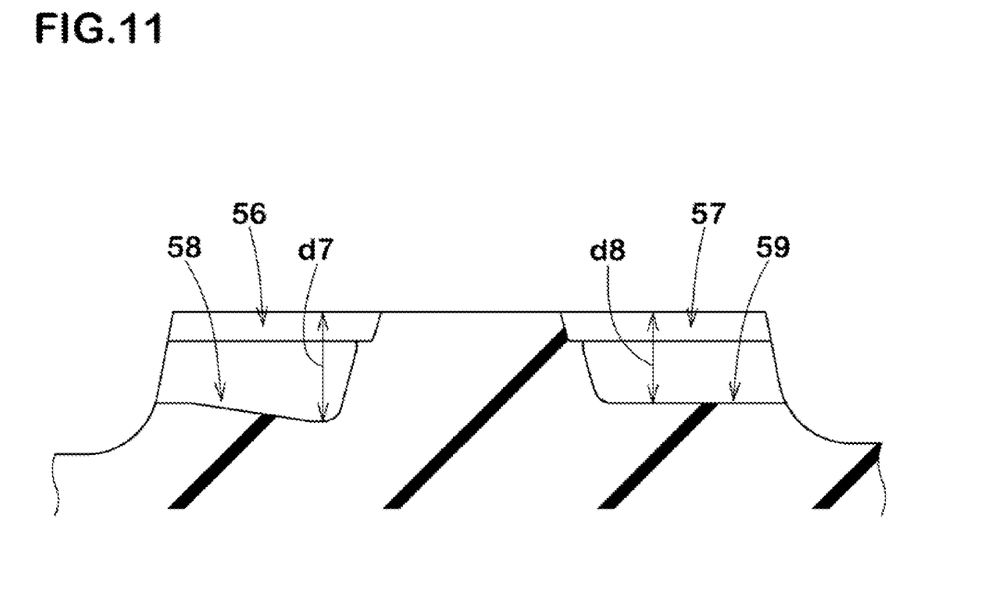
FIG. 11 is a cross-sectional view taken along the line G-G of FIG. 9.

FIG. 11 illustrates a cross-sectional view taken along the line G-G of FIG. 9. As illustrated in FIG. 11, each outer second middle lateral groove 56 has a groove bottom, and the groove bottom is provided with a groove bottom sipe 58. Each groove bottom sipe 58 has a depth increasing toward the second tread edge T2 (the right side in FIG. 11). In addition, each inner second middle lateral grooves 57 has a groove bottom, and the groove bottom is provided with a groove bottom sipes 59. The groove bottom sipe 59 has a constant depth in the extension direction of the inner second middle lateral groove 57. The depth d8 of the groove bottom sipe 59 from the ground contact surface of the second middle land portion 14 to the bottom of the groove bottom sipe 59 of the inner second middle lateral groove 57 is in a range from 75% to 90% of the maximum depth d7 of the groove bottom sipes 58 from the ground contact surface of the outer second middle lateral groove 56 to the bottom of the groove bottom sipes 58. This can suppress the uneven wear of the second middle land portion 14 while achieving the above-mentioned effect.

As illustrated in FIG. 9, the second middle land portion 14 is provided with only the above-mentioned outer second middle lateral grooves 56 with groove bottom sipes 58 and the inner second middle lateral grooves 57 with the groove bottom supes 59, and is not provided with grooves or sipes other than these. This can ensure that the above-mentioned effects are obtained.

A length L9 in the tire axial direction of the crown lateral grooves 60, for example, is in a range from 40% to 60% of a width W6 in the tire axial direction of the ground contact surface of the crown land portion 15. In some preferred embodiments, the length L9 of the crown lateral grooves 60 is greater than the length L7 of the outer second middle lateral grooves 56 and the length L8 of the inner second middle lateral grooves 57. This can improve steering stability and wet performance in a well-balanced manner.

The crown lateral grooves 60, for example, are inclined with respect to the tire axial direction in the opposite direction to the first middle lateral grooves 40 (shown in FIG. 2), the outer second middle lateral grooves 56 and the inner second middle lateral grooves 57. An angle with respect to the ire axial direction of the crown lateral grooves 60 is greater than the angle with respect to the first middle lateral grooves 40. Specifically, the angle of the crown lateral grooves 60 is in a range from 30 to 40 degrees. Such crown lateral grooves 60 can generate friction force in various directions in cooperation with the first middle lateral grooves 40, the outer second middle lateral grooves 56 and the inner second middle lateral grooves 57, improving wet performance.

Figure 12:
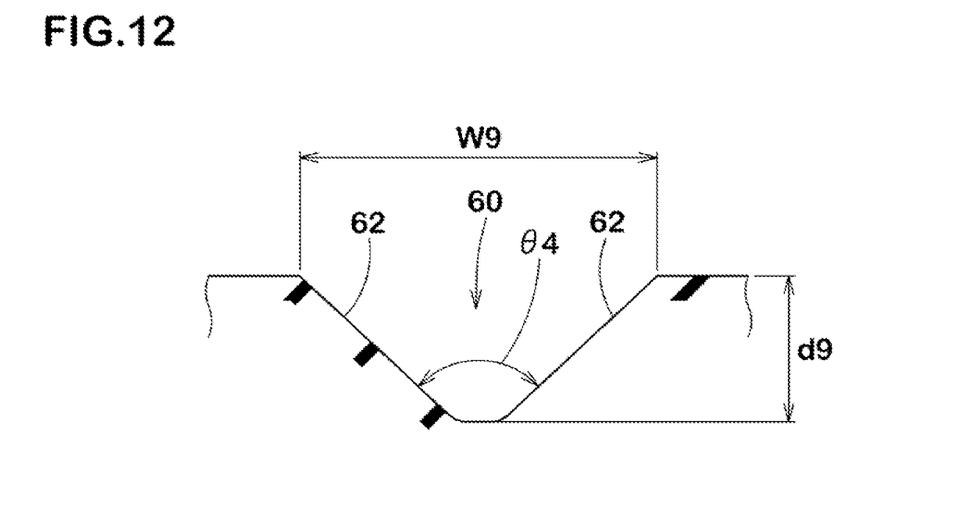
FIG. 12 is a cross-sectional view taken along the line E-E of FIG. 9.

FIG. 12 illustrates a cross-sectional view taken along the line E-E of FIG. 8. As illustrated in FIG. 12, the maximum groove depth d9 of the crown lateral grooves 60 is in a range from 10% to 30% of the maximum groove depth of the first crown circumferential groove 7. In addition, the maximum groove width W9 of the crown lateral grooves 60 is in a range from 2.0 to 3.0 times the maximum depth d9. These the crown lateral grooves 60 can provide better drainage while maintaining steering stability on dry road surfaces.

Each crown lateral groove 60 includes a pair of groove walls 62, and the maximum angle θ4 between the pair of grove walls 62 is equal to or more than 70 degrees. Thus, each crown lateral groove 60 has a cross-sectional shape like a triangular prism. Such a crown lateral groove 60 can improve steering stability on dry road surfaces and wet performance in a well-balanced manner. From the viewpoint of further improving the effect, the angle θ4 is preferably equal to or more than 80 degrees, more preferably equal to or more than 90 degrees, but preferably equal to or less than 130 degrees, more preferably equal to or less than 120 degrees.

Each crown lateral groove 60 has a groove bottom on which no groove bottom sipe is provided. Thus, the rigidity of the crown land portion 15 can be maintained, and excellent steering stability can be exerted.

As illustrated in FIG. 9, the crown land portion 15 is provided with only the above-mentioned crown lateral grooves 60, and is not provided with grooves or sipes other than these. This can ensure that the above-mentioned effects are obtained.

As illustrated in FIG. 1, the land ratio of the tread portion 2 is preferably in a range from 65% to 75% in order to achieve a good balance between steering stability and wet performance. The land ratio is the ratio of the actual ground contact area of the tread portion 2 to the virtual ground contact area with all the grooves and sipes filled in.

Although one or more embodiments of the tire has been described in detail above, the present disclosure is not limited to the above specific embodiments, but may be modified and implemented in various ways within the scope of the claims.

ADDITIONAL NOTE

The present disclosure includes the following aspects.
[Note 1]
A tire comprising:
a tread portion having a designated mounting direction on a vehicle, the tread portion comprising a first tread edge located outside the vehicle when mounted on the vehicle, a second tread edge located inside the vehicle when mounted on the vehicle, a plurality of circumferential grooves extending continuously in a tire circumferential direction between the first tread edge and the second tread edge, and a plurality of land portions divided by the plurality of circumferential grooves, wherein
the plurality of circumferential grooves comprises
a first shoulder circumferential groove located between the first tread edge and a tire equator,
a second shoulder circumferential groove located between the second tread edge and the tire equator,
a first crown circumferential groove located between the first shoulder groove and the tire equator, and
a second crown circumferential groove located between the second shoulder groove and the tire equator,
the plurality of land portions comprises
a first shoulder land portion having the first tread edge,
a second shoulder land portion having the second tread edge,
a first middle land portion divided between the first shoulder circumferential groove and the first crown circumferential groove,
a second middle land portion divided between the second shoulder circumferential groove and the second crown circumferential groove, and
a crown land portion divided between the first crown circumferential groove and the second crown circumferential groove,
the first shoulder land portion is provided with a plurality of first shoulder lateral grooves extending at least from the first tread edge to the first shoulder circumferential groove,
the second shoulder land portion is provided with a plurality of second shoulder lateral grooves extending inwardly in a tire axial direction at least from the second tread edge and terminating within the second shoulder land portion,
the first middle land portion is provided with a plurality of first middle lateral grooves extending from the first shoulder circumferential groove and terminating within the first middle land portion,
the second middle land portion is provided with a plurality of outer second middle lateral grooves extending from the second crown circumferential groove and terminating within the second middle land portion and
a plurality of inner second middle lateral grooves extending from the second shoulder circumferential groove and terminating within the second middle land portion, and
the crown land portion is provided with a plurality of crown lateral grooves extending from the first crown circumferential groove and terminating within the crown land portion.
[Note 2]
The tire according to note 1, wherein
a maximum groove depth of each of the plurality of first middle lateral grooves is in a range from 10% to 30% of a maximum groove depth of the first shoulder circumferential groove.
[Note 3]
The tire according to note 1 or 2, wherein
a maximum groove depth of each of the plurality of outer second middle lateral grooves and the plurality of inner second middle lateral grooves is in a range from 10% to 30% of a maximum groove depth of the second shoulder circumferential groove.
[Note 4]
The tire according to any one of notes 1 to 3, wherein
a maximum groove depth of each of the plurality of crown lateral grooves is in a range from 10% to 30% of a maximum groove depth of the first crown circumferential groove.
[Note 5]
The tire according to any one of notes 1 to 4, wherein
each of the plurality of first middle lateral grooves has a maximum groove width in a range from 2.0 to 3.0 times a maximum groove depth thereof.
[Note 6]
The tire according to any one of notes 1 to 5, wherein
each of the plurality of outer second middle lateral grooves and the plurality of inner second middle lateral grooves has a maximum groove width in a range from 2.0 to 3.0 times a maximum groove depth thereof
[Note 7]
The tire according to any one of notes 1 to 6, wherein
each of the plurality of crown lateral grooves has a maximum groove width in a range from 2.0 to 3.0 times a maximum groove depth thereof
[Note 8]
The tire according to any one of notes 1 to 7, wherein
each of the plurality of first middle lateral grooves, the plurality of outer second middle lateral grooves, the plurality of inner second middle lateral grooves and the plurality of crown lateral grooves has a pair of groove walls, and
a maximum angle between the pair of groove walls is equal to or more than 70 degrees.
[Note 9]
The tire according to any one of notes 1 to 8, wherein
at a groove bottom of each of the plurality of first middle lateral grooves, a groove bottom sipe that extends inwardly in a tire radial direction from the groove bottom is formed.

[Note 10]

The tire according to any one of notes 1 to 9, wherein a groove bottom of each of the plurality of outer second middle lateral grooves and the plurality of inner second middle lateral grooves is provided with a groove bottom sipe extending inwardly in a tire radial direction from the groove bottom.

[Note 11]

The tire according to any one of notes 1 to 10, wherein each of the plurality of first shoulder lateral grooves has a pair of groove walls, and at least one of the pair of groove walls has a chamfer portion.

[Note 12]

The tire according to note 11, wherein each of the plurality of first shoulder lateral grooves has the chamfer portion formed on both of the pair of groove walls, the pair of groove walls comprises a first groove wall on a first side in the tire circumferential direction and a second groove wall on a second side in the tire circumferential direction, the chamfer portion of the first groove wall has a first inclined surface between a ground contact surface of the first shoulder land portion and the first groove wall, the chamfer portion of the second groove wall has a second inclined surface between the ground contact surface of the first shoulder land portion and the second groove wall, and a maximum width of the second inclined surface is greater than a maximum width of the first inclined surface in a tread plan view.

[Note 13]

The tire according to any one of notes 1 to 12, wherein a groove bottom of each of the plurality of first shoulder lateral grooves is provided with a tie-bar whose groove bottom is locally raised.

[Note 14]

The tire according to any one of notes 1 to 13, wherein each of the plurality of second shoulder lateral grooves has a pair of groove walls, and at least one of the pair of groove walls has a chamfer portion.

[Note 15]

The tire according to any one of notes 1 to 14, wherein the tread portion has a land ratio of from 65% to 75%.

The invention claimed is:

1. A tire comprising:

a tread portion having a designated mounting direction on a vehicle, the tread portion comprising a first tread edge located outside the vehicle when mounted on the vehicle, a second tread edge located inside the vehicle when mounted on the vehicle, circumferential grooves extending continuously in a tire circumferential direction and disposed between the first tread edge and the second tread edge, and land portions divided by the circumferential grooves, wherein the circumferential grooves comprises a first shoulder circumferential groove located between the first tread edge and a tire equator, a second shoulder circumferential groove located between the second tread edge and the tire equator, a first crown circumferential groove located between the first shoulder groove and the tire equator, and a second crown circumferential groove located between the second shoulder groove and the tire equator, the land portions comprises a first shoulder land portion having the first tread edge, a second shoulder land portion having the second tread edge, a first middle land portion between the first shoulder circumferential groove and the first crown circumferential groove, a second middle land portion between the second shoulder circumferential groove and the second crown circumferential groove, and a crown land portion between the first crown circumferential groove and the second crown circumferential groove, the first shoulder land portion is provided with first shoulder lateral grooves extending from the first tread edge to the first shoulder circumferential groove, the second shoulder land portion is provided with second shoulder lateral grooves extending inwardly in a tire axial direction from the second tread edge and terminating within the second shoulder land portion, the first middle land portion is provided with first middle lateral grooves extending from the first shoulder circumferential groove and terminating within the first middle land portion, the second middle land portion is provided with outer second middle lateral grooves extending from the second crown circumferential groove and terminating within the second middle land portion and inner second middle lateral grooves extending from the second shoulder circumferential groove and terminating within the second middle land portion, and the crown land portion is provided with crown lateral grooves extending from the first crown circumferential groove and terminating within the crown land portion, wherein each of the first shoulder lateral grooves has a first groove wall on a first side in the tire circumferential direction and a second groove wall on a second side in the tire circumferential direction, in which the first groove wall is provided with a chamfer portion having a first inclined surface between a ground contact surface of the first shoulder land portion and the first groove wall, and the second groove wall is provided with a chamfer portion having a second inclined surface between the ground contact surface of the first shoulder land portion and the second groove wall;

each of the second shoulder lateral grooves has a first groove wall on the first side in the tire circumferential direction and a second groove wall on the second side in the tire circumferential direction, in which the first groove wall is provided with a chamfer portion having a third inclined surface between a ground contact surface of the second shoulder land portion and the first groove wall, and the second groove wall is provided with a chamfer portion having a fourth inclined surface between the ground contact surface of the second shoulder land portion and the second groove wall; and in a tread plan view, a maximum width of the first inclined surface is smaller than a maximum width of the second inclined surface, whereas a maximum width of the third inclined surface is greater than a maximum width of the fourth inclined surface, wherein in the second middle land portion, each of the outer second middle lateral grooves has a pair of groove walls, in which a width of the groove wall on the first side in the tire circumferential direction is smaller than a width of the groove wall on the second side in the tire circumferential direction in the tread plan view, whereas each of the inner second middle lateral grooves has a pair of groove walls, in which a width of the groove wall on the first side in the tire circumferential direction is greater than a width of the groove wall on the second side in the tire circumferential direction in the tread plan view; and in the first middle land portion, each of the first middle lateral grooves has a pair of groove walls, in which a width of the groove wall on the first side in the tire circumferential direction is smaller than a width of the groove wall on the second side in the tire circumferential direction in the tread plan view.

2. The tire according to claim 1, wherein a maximum groove depth of each of the first middle lateral grooves is in a range from 10% to 30% of a maximum groove depth of the first shoulder circumferential groove.

3. The tire according to claim 1, wherein a maximum groove depth of each of the outer second middle lateral grooves and the inner second middle lateral grooves is in a range from 10% to 30% of a maximum groove depth of the second shoulder circumferential groove.

4. The tire according to claim 1, wherein a maximum groove depth of each of the crown lateral grooves is in a range from 10% to 30% of a maximum groove depth of the first crown circumferential groove.

5. The tire according to claim 1, wherein each of the first middle lateral grooves has a maximum groove width in a range from 2.0 to 3.0 times a maximum groove depth thereof.

6. The tire according to claim 1, wherein each of the outer second middle lateral grooves and the inner second middle lateral grooves has a maximum groove width in a range from 2.0 to 3.0 times a maximum groove depth thereof.

7. The tire according to claim 1, wherein each of the crown lateral grooves has a maximum groove width in a range from 2.0 to 3.0 times a maximum groove depth thereof.

8. The tire according to claim 1, wherein in the pair of groove walls of each of the first middle lateral grooves, the outer second middle lateral grooves, and the inner second middle lateral grooves and a pair of groove walls of each of the crown lateral grooves, a maximum angle between each pair of groove walls is equal to or more than 70 degrees.

9. The tire according to claim 1, wherein the tread portion has a land ratio of from 65% to 75%.

10. The tire according to claim 1, wherein the maximum width W2 of the second inclined surface is in a range from 1.5 to 3.5 times the maximum width W1 of the first inclined surface.

11. The tire according to claim 10, wherein in each of the first shoulder lateral grooves, the chamfer portion on the first groove wall has a chamfer depth same as that of the chamfer portion on the second groove wall.

12. The tire according to claim 1, wherein each of the first shoulder lateral grooves has a substantially constant width from the first shoulder circumferential groove to the first tread edge, whereas each of the second shoulder lateral grooves has a variable width increasing from the termination end thereof toward the second tread edge.

13. The tire according to claim 12, wherein the first middle lateral grooves and the outer and inner second middle lateral grooves are each provided, in the groove bottom thereof, with a radially inwardly extending sipe, whereas the crown lateral grooves are each provided with no sipe in the groove bottom thereof.

14. The tire according to claim 13, wherein with respect to the tire axial direction, the outer second middle lateral grooves and the inner second middle lateral grooves are inclined in the same direction, whereas the crown lateral grooves are inclined in an opposite direction to the outer and inner second middle lateral grooves.

15. The tire according to claim 14, wherein each of the first shoulder lateral grooves is provided with a siped tie bar, the siped tie bar has a radially outer surface extending parallel with the ground contact surface of the first shoulder land portion and having a first edge, a second edge and a third edge, the first edge and the second edge are respectively connected to the first groove wall and the second groove wall of the first shoulder lateral groove, the length L4 of the second edge is smaller than the length L3 of the first edge, the third edge extends from the end on the first tread edge side of the second edge to the end on the first tread edge side of the first edge, while inclining at an angle of 10 to 30 degrees with respect to the tire axial direction, and the radially outer surface of the siped tie bar is provided with a sipe, whereas the second shoulder lateral grooves are not provided with a siped tie bar.

16. The tire according to claim 15, wherein the length L4 of the second edge is in a range from 20% to 60 of the length L3 of the first edge.

17. The tire according to claim 15, wherein the siped tie bar is located at an end on the first shoulder circumferential groove side of each of the first shoulder lateral grooves.

* * * * *